(No Model.)

J. O. BROWN.
TIRE FOR BICYCLES.

No. 264,133. Patented Sept. 12, 1882.

Attests
Frederick W. Ritter
Davis

Inventor
James O. Brown
By his atty

UNITED STATES PATENT OFFICE.

JAMES O. BROWN, OF BANGOR, MAINE.

TIRE FOR BICYCLES.

SPECIFICATION forming part of Letters Patent No. 264,133, dated September 12, 1882.

Application filed June 28, 1882. (No model.)

*To all whom it may concern:*

Be it known that I, JAMES O. BROWN, of the city of Bangor, county of Penobscot, and State of Maine, have invented an Improvement in Tires for Bicycles, &c., of which the following is a specification.

My invention has reference to tires for bicycles and analogous vehicles; and it consists in twisting together two or more strands of a flexible material, as rubber, and placing said tire upon the periphery of a bicycle-wheel; further, in twisting in with said strands of flexible material one or more wires; further, in grooving the periphery of the wheel to correspond with the strands in the tire, all of which are more fully set forth in the following specification and shown in the accompanying drawings, which form part thereof.

The object of my invention is to form a tire of two or more strands of flexible material, as rubber, to give a better springing effect to the bicycle; also, to prevent its slipping on the wheel; also, by twisting wires with it to prevent all possibility of the tire being cut, and to provide means for securing said tire on the wheel without cement.

Figure 1:
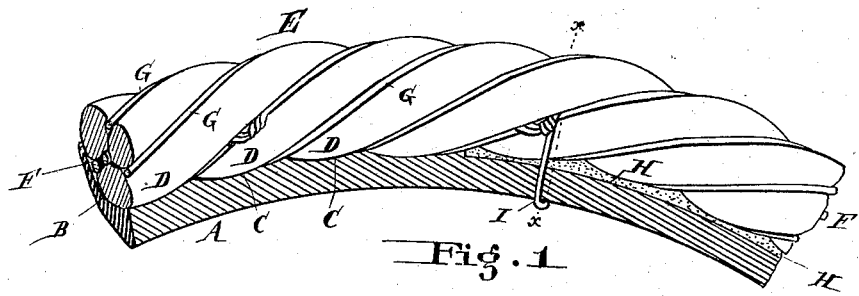
Figure 2:
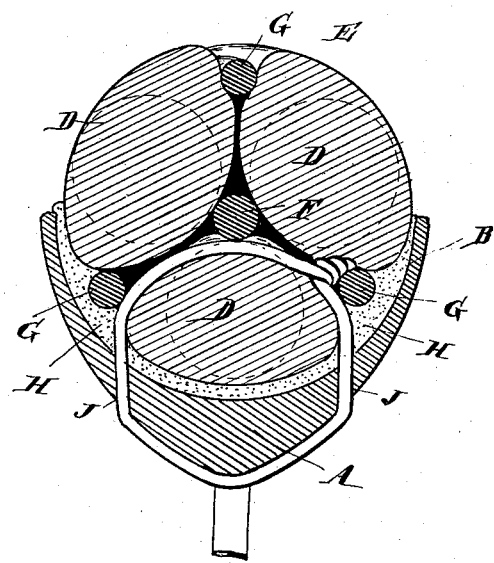

In the drawings, Figure 1 is an elevation of a piece of the tire as applied to the rim of a wheel, which latter is shown in section, and Fig. 2 is a cross-section of same on line *x x*.

A is the rim of the wheel, which is provided with a deep groove, B, made annular or encircling the wheel, which groove is further grooved obliquely, forming furrows C, in which the strands of the tire D fit to prevent all slipping.

The tire E is made of two or more strands, D, twisted together like a rope, said strands being made of flexible material, as rubber or rawhide. In making the tire I take a piece of rubber of the desired cross-section and about nine times the diameter of the wheel and twist it together, forming three strands, as shown, and only leaving two ends to weave in or otherwise secure together. If I use a smaller rubber, it may be twisted into a half a dozen strands and still only have two ends to join in place of twelve. These strands fit into the furrows C upon the grooved surface of the wheel, thereby dispensing with cement. A central wire, F, is arranged through the middle of the tire E and forms a core to the same, and one or more wires, G, are twisted in with the strands and arranged between any two adjacent strands. These wires enable the tire to resist all tendency to cut if the wheel should run upon a sharp stone or a piece of glass, and by twisting the wires at any point in their circumference they may be shortened and bind the tire firmly upon the wheel.

While I prefer rubber as the flexible material from which to make the tire, I do not limit myself to it, as any other flexible material may be used in lieu thereof.

When the material of which the tire is made is not sufficiently flexible I insert a thin sheet of elastic material, H, between said tire and wheel-flange and located in the groove B, as shown. In this case the grooves C may be dispensed with. Nor are they absolutely necessary when the tire is used without an interposed elastic cushion, as the tire is held firmly in place by a series of staples or wire bands, I, which are passed through holes J in the wheel-rim and passed around one or more of the tire-strands D, and have their ends twisted together and tucked in between two adjacent strands.

A wheel-tire made in accordance with the above, when the strands are made of rawhide, is most durable, and has all of the properties of the single round rubber tire now in general use upon bicycles.

The tire may be made of three or more or even two strands twisted together; but in these cases there would be four or more ends to join. Hence I prefer to make the tire of one long strand, as described.

Having now described my invention, what I claim as new, and desire to secure by Letters Patent, is—

1. A tire for wheels for bicycles, &c., which consists of two or more strands of flexible material and one or more wires twisted together, substantially as and for the purpose specified.

2. A tire for wheels for bicycles, &c., which consists of a strand of flexible material six or more times the diameter of the tire in length, twisted into itself to form an endless tire of two or more strands, substantially as and for the purpose specified.

3. In a tire for wheels, the combination of wheel-rim A, having groove B and furrows C, and flexible tire E, substantially as and for the purpose specified.

4. In a tire for wheels, the combination of strands D with wires F and G, substantially as shown.

5. In a tire for wheels, the combination of twisted strands of flexible material D with central wire, F, substantially as shown.

6. In a tire for wheels, the combination of the rim of wheel A, having groove B, tire E, made of twisted strands D, and staples or wire bands I, substantially as and for the purpose specified.

7. In a tire for wheels, the combination of the rim of wheel A, having groove B, tire E, made of twisted strands D, of flexible material, cushion H, and staples or wire bands I, substantially as and for the purpose specified.

In testimony of which invention I hereunto set my hand.

JAMES O. BROWN.

Witnesses:
R. S. CHILD, Jr.,
R. A. CAVIN.